(12) United States Patent
Hoyer

(10) Patent No.: US 7,707,475 B2
(45) Date of Patent: *Apr. 27, 2010

(54) 64B/66B CODING APPARATUS AND METHOD

(75) Inventor: Claus F. Hoyer, Espergaerde (DK)

(73) Assignee: Forestay Research, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,426

(22) Filed: Jan. 5, 2009

(65) Prior Publication Data

US 2009/0119571 A1    May 7, 2009

Related U.S. Application Data

(63) Continuation of application No. 11/251,203, filed on Oct. 17, 2005, now Pat. No. 7,487,426.

(51) Int. Cl.
*H03M 13/00* (2006.01)
(52) U.S. Cl. ....................................... 714/752
(58) Field of Classification Search .................. 714/752
See application file for complete search history.

(56) References Cited

U.S. PATENT DOCUMENTS

| | | | |
|---|---|---|---|
| 4,486,739 A | 12/1984 | Franaszek et al. | |
| 6,539,051 B1 * | 3/2003 | Grivna | 375/219 |
| 6,650,638 B1 | 11/2003 | Walker et al. | |
| 6,662,332 B1 * | 12/2003 | Kimmitt | 714/762 |
| 6,718,491 B1 | 4/2004 | Walker et al. | |
| 7,076,724 B2 | 7/2006 | Cole et al. | |
| 7,081,838 B2 * | 7/2006 | Hoyer | 341/58 |
| 7,187,307 B1 * | 3/2007 | Schmidt et al. | 341/50 |

(Continued)

OTHER PUBLICATIONS

"International Search Report and Written Opinion of the International Searching Authority Dated Feb. 6, 2007", International Application No. PCT/US2006/040653.

(Continued)

*Primary Examiner*—Esaw T Abraham
(74) *Attorney, Agent, or Firm*—SoCal IP Law Group LLP; Steven C. Sereboff; John E. Gunther

(57) ABSTRACT

A system and method for transmitting digital data over a transmission medium includes receiving digital values representing a plurality of N-bit characters to be output over the transmission medium, each N-bit character being either a data character or a control character. A determination is made as to which of the plurality of N-bit characters are control characters. The digital values represented by the plurality of N-bit characters are encoded to provide an encoded codeword, the encoded codeword being {M×(N−1)+P} bits having M fields of N−1 bits, each of the M fields corresponding to one of the N-bit characters being encoded. The encoding further includes: designating, for each data character, the respective field of the M fields as a data field, designating, for each control character, the respective field of the M fields as a control field, and ordering the M fields to position any control fields at predetermined positions with respect to each other in the encoded codeword and to position any data fields at other remaining positions within the encoded codeword. The encoded codeword is then transmitted over the transmission medium. A system and method that receives such an encoded codeword over a transmission medium is also contemplated.

24 Claims, 7 Drawing Sheets

U.S. PATENT DOCUMENTS

| | | |
|---|---|---|
| 7,257,759 B2 | 8/2007 | Raahemi |
| 7,296,211 B2 | 11/2007 | Cole et al. |
| 7,302,631 B2 * | 11/2007 | Bansal ..................... 714/775 |
| 2003/0152154 A1 | 8/2003 | Johnson |
| 2003/0185251 A1 | 10/2003 | Ichino et al. |
| 2004/0109509 A1 | 6/2004 | Stonecypher et al. |
| 2004/0228364 A1 | 11/2004 | Walker et al. |

OTHER PUBLICATIONS

IEEE Std. 802.3ae 2002, Clause 49, "Physical Coding Sublayer (PCS) for 64B/66B, type 10GBASE-R", pp. 317-345.

IEEE Std. 802.3ae 2002, Clause 46, "Reconciliation Sublayer (RS) and 10 Gigabit Media Independent Interface (XGMII)", pp. 247-269.

IEEE Std. 802.3ae 2002, Clause 47, "XGMII Exterior Sublayer (XGXS) and 10 Gigabit Attachment Unit Interface (XAUI)", pp. 271-283.

Walker, R., et al., "64B/66B Coding Updated", *Announcement Agilent Technologies*, XP002953617, (2000), pp. 1-19.

Widmer, A.X., et al., "A DC-Balanced, Partitioned-Block, 8B/10B Transmission Code", *IBM Journal of Research and Development*, vol. 27, No. 5, (Sep. 1983), pp. 440-451.

* cited by examiner

64B/66B CODING APPARATUS AND METHOD

CROSS-REFERENCE TO RELATED APPLICATION

This application is a continuation of U.S. patent application Ser. No. 11/251,203 filed Oct. 17, 2005.

BACKGROUND OF THE INVENTION

A. Field of the Invention

The invention relates generally to coding, and, more particularly, to a 64b/66b coding scheme that is used to send and receive data and control information over a serial transmission medium.

B. Description of the Related Art

In modern communication systems, unidirectional high-speed serial links using Non Return to Zero (NRZ) signaling are often employed for communication between chips on a board or between boards in a modular system.

Before being transmitted on a high-speed serial link, data needs to be encoded to obtain certain properties required for reliable communication:

A certain bit transition density is required to ensure the receiving clock-data-recovery circuitry is capable of extracting a suitable receive clock from the bit stream.

Since data is presented to the receiver as a continuous stream of bits, some information is needed for the receiver to be able to infer boundaries to differentiate one data word from another in the bit stream.

As most high-speed serial links operate in an AC-coupled manner, i.e., employing a DC-blocking cap in the path between a transmitter and a receiver, the transmitted bit stream needs to be DC-balanced.

For high-speed serial links using NRZ signaling, the 8b/10b coding scheme has provided a coding scheme that "guarantees" all of these properties. Such an 8b/10b coding scheme is described in the IBM Journal of Research and Development, Vol. 27, No. 5, September 1983, "A DC-Balanced, Partitioned-Block 8B/10 B Transmission Code" by Widmer and Franaszek.

The coding overhead of the 8b/10b coding scheme is 25%, i.e., the encoder adds 2 bits of extra information for every 8 user bits. As the bit rate of the high-speed serial links increases, this overhead grows immensely in terms of absolute bandwidth. For example, consider a serial link that is capable of transmitting data at a rate of 10 Gbps (Gigabits per second). If the 8b/10 b coding scheme is used, only 8 Gbps would be available for actual user data, with the remaining 2 Gbps needed for the coding overhead.

Recently, a much-lower overhead coding scheme known as 'IEEE 64b/66 b' has been devised. The IEEE 64b/66b coding scheme is described in various respects in the following references:

IEEE Std 802.3ae 2002, Clause 49, "Physical Coding Sublayer (PCS) for 64 B/66 B, type 10GBASE-R".

U.S. Pat. No. 6,650,638, "Decoding Method and Decoder for 64b/66 b Coded Packetized Serial", by Richard Walker et al.

U.S. Pat. No. 6,718,491, "Coding Method and Coder for Coding Packetized Serial Data with Low Overhead", by Richard Walker et al.

U.S. Patent Publication No. 2004/0228364 "Coding Method and Coder for Coding Packetized Serial Data with Low Overhead", by Richard Walker et al.

The IEEE 64b/66b coding scheme has been developed for transporting a 10 Gbps Ethernet data stream over a single high-speed serial link running 10.3125 Gbps, and thus it has a coding overhead of only 3.125%.

While the IEEE 64b/66b coding scheme satisfies the three desirable properties described earlier, it has certain restrictions on the user data that can be carried. These restrictions may not adversely affect the intended application of carrying a XAUI data stream or a restricted XGMII data stream, as the IEEE 64b/66b coding scheme has been specifically designed with this application in mind. However, for other applications, the restrictions of the IEEE 64b/66 b coding scheme can significantly limit its usefulness.

Hence, a new 64b/66b coding scheme is needed that is applicable to many different types of data streams.

SUMMARY OF THE INVENTION

According to at one aspect of the invention, there is provided a method of transmitting digital data over a transmission medium includes receiving digital values representing a plurality of N-bit characters to be output over the transmission medium, each N-bit character being either a data character or a control character. A determination is made as to which of the plurality of N-bit characters are control characters. The digital values represented by the plurality of N-bit characters are encoded to provide an encoded codeword, the encoded codeword being $\{M \times (N-1)+P\}$ bits having M fields of N−1 bits, each of the M fields corresponding to one of the N-bit characters being encoded. The encoding further includes: designating, for each data character, the respective field of the M fields as a data field, designating, for each control character, the respective field of the M fields as a control field, and ordering the M fields to position any control fields at predetermined positions with respect to each other in the encoded codeword and to position any data fields at other remaining positions within the encoded codeword. The encoded codeword is then transmitted over the transmission medium.

According to another aspect of the invention, there is provided a system for transmitting digital data over a transmission medium. The system includes a receiver configured to receive digital values representing a plurality of N-bit characters to be output over the transmission medium, each of the N-bit characters being either a data character or a control character. The system also includes a controller configured to determine which, if any, of the plurality of N-bit characters are control characters. The system further includes an encoder configured to encode the digital values represented by the plurality of N-bit characters to provide an encoded codeword, the encoded codeword being $\{M \times (N-1)+P\}$ bits having M fields of N−1 bits, each of said M fields corresponding to one of the N-bit characters being encoded. The encoder is further configured to: designate, for each data character, the respective field of the M fields as a data field, designate, for each control character, the respective field of the M fields as a control field, and order the M fields to position any control fields at predetermined positions with respect to each other in the encoded codeword and to position any data fields at other remaining positions within the encoded codeword. The system still further includes a transmitter configured to transmit the encoded codeword over the transmission medium. M and N are integer values greater than 1, and P is an integer value greater than or equal to 1.

According to yet another aspect of the invention, there is provided a system for receiving digital data over a transmission medium, in which the system includes a receiving unit configured to receive a $\{M \times (N-1)+P\}$-bit codeword that has been output over the transmission medium, the $\{M \times (N-1)+$ P}-bit codeword including M fields of N−1 bits. The system also includes a determining unit configured to determine whether any of the M fields included in the {M×(N−1)+P}-bit codeword represent control characters. The system further includes a decoding unit configured to decode the {M×(N−1)+P}-bit codeword to obtain digital values that represent M consecutive N-bit characters that respectively correspond to the M fields of N−1 bits included in the {M×(N−1)+P}-bit codeword, each of the M fields being either a data field or a control field that corresponds to a data character or control character, respectively. The decoding unit performs re-ordering the M fields of N−1 bits based on position information provided within any control fields of the M fields of N−1 bits, wherein M and N are integer values greater than 1, and wherein P is an integer value greater than or equal to 1.

According to still another aspect of the invention, there is provided a method of receiving digital data over a transmission medium, which includes receiving a {M×(N−1)+P}-bit codeword that has been output over the transmission medium, the {M×(N−1)+P}-bit codeword including M fields of N−1 bits. The method also includes determining whether any of the M fields included in the {M×(N−1)+P}-bit codeword represent control characters. The method further includes decoding the {M×(N−1)+P}-bit codeword to obtain digital values that represent M consecutive N-bit characters that respectively correspond to the M fields of N−1 bits included in the {M×(N−1)+P}-bit codeword, each of the M fields being either a data field or a control field that corresponds to a data character or control character, respectively. The decoding step includes re-ordering the M fields of N−1 bits based on position information provided within any control fields of the M fields of N−1 bits, wherein M and N are integer values greater than 1, and wherein P is an integer value greater than or equal to 1.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

At least one aspect of the present invention relates to a 64b/66b coding scheme that does not have the same restrictions on the user data stream to be transmitted while retaining the important properties of the IEEE 64b/66b coding scheme.

To be able to transparently convey additional control information, such as data packet delimiters, in the same physical high-speed serial link that carries the data, it is necessary to encode additional control information that is readily distinguishable from the data. The term character is defined to mean either a data character (typically a byte with 256 possible values), or a control character (which has a relatively small number of possible values). Hence a high-speed serial link carries a sequence of encoded characters.

The well-known 8b/10b coding scheme defines 256 data characters and 13 control characters. The 64b/66b coding scheme according to the first embodiment is compatible with the 8b/10b codec at the (unencoded) character level, thereby allowing protocols designed for 8b/10 b-style communication channels to be carried transparently on high-speed serial links using the 64b/66b coding scheme according to the first embodiment.

The ability to support an arbitrary sequence of control and data characters is one feature which sets the 64b/66b coding scheme according to the first embodiment apart from the IEEE 64b/66b coding scheme. The present concept can also be applied with having some restrictions of control and data characters. The design of the IEEE 64b/66b coding scheme relies heavily on the fact that the XAUI and (restricted) XGMII protocols only use a few, specific combinations of control characters and data characters. In fact, it appears to have been implied that a coding scheme capable of carrying any combination of control and data characters can not achieve less than 12.5% coding overhead. See, for example, U.S. Pat. Nos. 6,650,638 and 6,718,491, and U.S. Patent Publication No. 2004/0228364.

Figure 1:
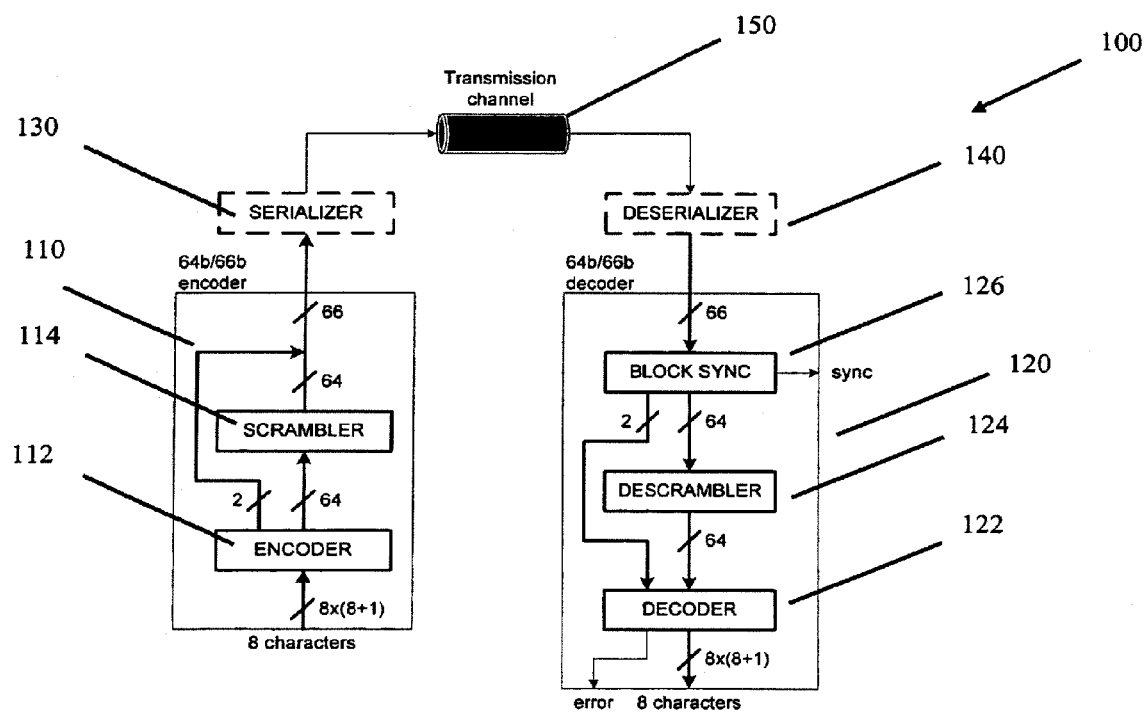
FIG. 1 shows a 64b/66b encoding unit and a 64b/66b decoding unit communicatively coupled to a transmission channel, according to a first embodiment of the invention.

FIG. 1 shows a block diagram of a 64b/66b encoder and decoder system 100 according to a first embodiment of the invention. The 64b/66b encoder and decoder system 100 includes a 64b/66b encoder 110, a 64b/66b decoder 120, a serializer 130, a deserializer 140, and a transmission channel 150. The 64b/66b encoder 110 includes an encoder 112 and a scrambler 114. The 64b/66b decoder 120 includes a decoder 122, a descramnbler 124, and a block synchronizer 126.

At the input to the 64b/66b encoder 110, 8 characters are input at a time (e.g., input in parallel to the encoder 112). Each character is represented by 8 data bits D and a single control bit Z. When Z=0, the D bits carry one of the 256 possible values for a data character. When Z=1, the D bits identifies one of the 13 possible control characters (as defined by the relevant IEEE standard for 8b/10b coding).

The encoder 112 encodes the 8 characters into a 64 bit data frame and 2 frame header bits. The 64-bit data frame is then scrambled by the scrambler 114 to achieve statistical DC-balancing, and, at the output of the scrambler 114, the 64-bit data frame is concatenated with the 2 frame header bits, to obtain a 66-bit codeword. After being serialized by the serializer 130, the 66-bit codeword is transmitted over the transmission channel 150. The transmission channel 150 can be any form of communication channel capable of transmitting data, and may include several network or channel mediums.

At the receiving end, after deserialization by the deserializer 140, the 66 bits of the received codeword are presented to the block synchronizer 126, which establishes the correct 66-bit boundary by analyzing the frame header bits of the received data in order to achieve synchronization. The 64-bit data frame is descrambled by the self-synchronizing descrambler 124, and the result is fed together with the 2 frame header bits from synchronizer 126 to the decoder 122, which outputs 8 characters along with an indication of receive errors (if any).

Compared to the IEEE 64b/66b coding scheme, only the encoder 112 and the decoder 122 of the first embodiment of the present invention operate and function differently than the 64b/66b coding scheme. The 64b/66b coding scheme according to the first embodiment preferably uses the same scrambling method in the scrambler 114 and the descrambler 124 and the same scrambling polynomial, $G(x)=x^{58}+x^{39}+1$, as used in the IEEE 64b/66b coding scheme.

Furthermore, the 64b/66b coding scheme according to the first embodiment preferably defines the frame header bits in a way compatible with the IEEE 64b/66b coding scheme for purposes of block synchronization, and hence uses the same definition for the block synchronizer 26. Accordingly, operation of the block synchronizer 126, the scrambler 114 and the descrambler 124 will not be described in detail herein. The typical exemplary structure and operation of those components are described in detail in IEEE Std 802.3ae 2002, Clause 49, 'Physical Coding Sublayer (PCS) for 64 B/66 B, type 10GBASE-R', which document is incorporated in its entirety herein by reference.

The 8b/10b coding scheme includes the following 13 control characters in addition to the 256 data characters: K28.0; K28.1; K28.2; K28.3; K28.4; K28.5; K28.6; K28.7; K23.7; K27.7; K29.7; K30.7; K0.7. The K0.7 control character is an extension of the original 8b/10b character set that has only 12 control characters. K0.7 is only defined for the encoder and is not recognized by the decoder in the 8b/10b coding scheme. It is used for deterministically introducing errors without otherwise jeopardizing the properties of the coding scheme.

Each of the 8 characters input to the encoder 110 can be an arbitrary one of the above set of control characters or it can be an arbitrary data character (e.g., one of $2^8$ possible data characters).

Figure 2:
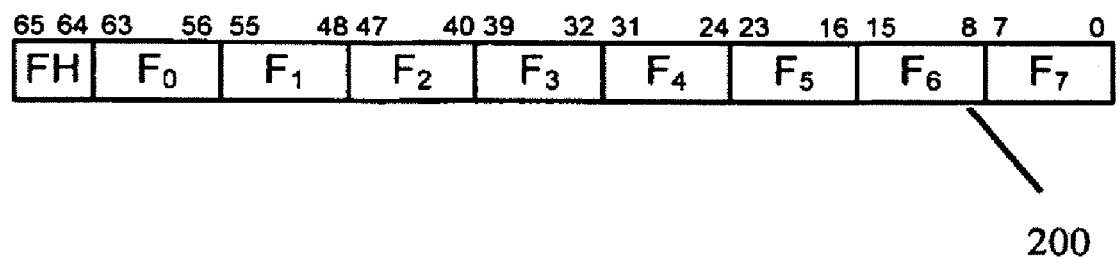
FIG. 2 shows the fields of a 66-bit codeword according to the first embodiment of the invention.

The 64b/66b coding scheme according to the first embodiment divides the 66-bit code word into 9 fields in the codeword 200 as shown in FIG. 2. In particular, the 66-bit code word is divided into an FH (Frame Header) field, an $F_0$ field, an $F_1$ field, an $F_2$ field, an $F_3$ field, an $F_4$ field, an $F_5$ field, an $F_6$ field, and an $F_7$ field. Each of the $F_0$-$F_7$ fields is 8 bits in size, while the FH field is 2 bits in size. In an alternative construction, the FH field may be 1 bit in size, which can be utilized in cases where DC balancing is not a major issue.

The FH field, which occupies the highest two bit positions in the 66-bit codeword, is a 2-bit frame header field that determines the overall type of the 66-bit frame. Each of the eight 8-bit fields $F_0$-$F_7$ describes one of the 8 characters represented by the 66-bit codeword. The codeword has the same structure at the output of the encoder 112 and at the output of the scrambler 114, but whereby the fields $F_0$-$F_7$ are scrambled by the scrambler 114. To simplify the discussion below, only the output of the encoder 112 is considered.

The FH field is defined as follow:

| FH | Definition |
| --- | --- |
| 00 | Illegal |
| 01 | All 8 fields $F_0$-$F_7$ are data fields |
| 10 | At least one of the fields $F_0$-$F_7$ is a control field |
| 11 | Illegal |

The FH field is given two legal values, 01 and 10, which both have excellent DC balancing properties (e.g., the same number of zeros and ones) as well as contains a transition useful for clock-data-recovery (CDR).

Figure 3:
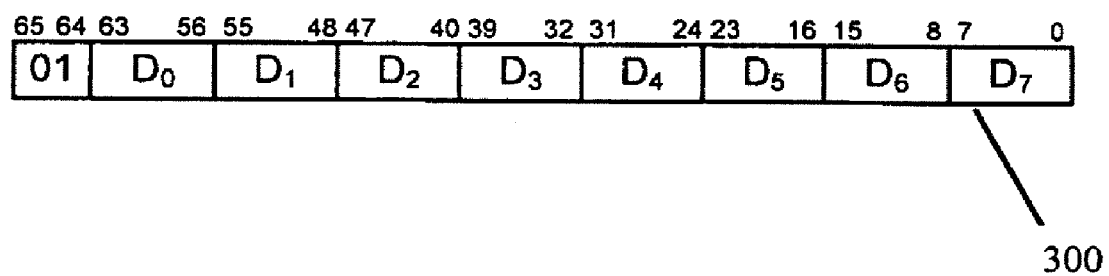
FIG. 3 shows a 66-bit codeword with eight data fields corresponding to eight data characters according to the first embodiment of the invention.

When all 8 characters represented by the 66-bit codeword are data characters, FH=01 and the 8 fields $F_0$-$F_7$ are used as data fields $D_0$-$D_7$ in the codeword 300 as shown in FIG. 3, each data field carrying the data byte for one of the data characters. The most significant bit of each data byte is at the highest numbered bit within its data field of the codeword. Thus, for example, the most significant bit of the data byte in data field $D_0$ is placed in bit position 63 in the 66-bit codeword, the most significant bit of the data byte in data field $D_1$ is placed in bit position 55 of the 66-bit codeword, etc.

Figure 4:
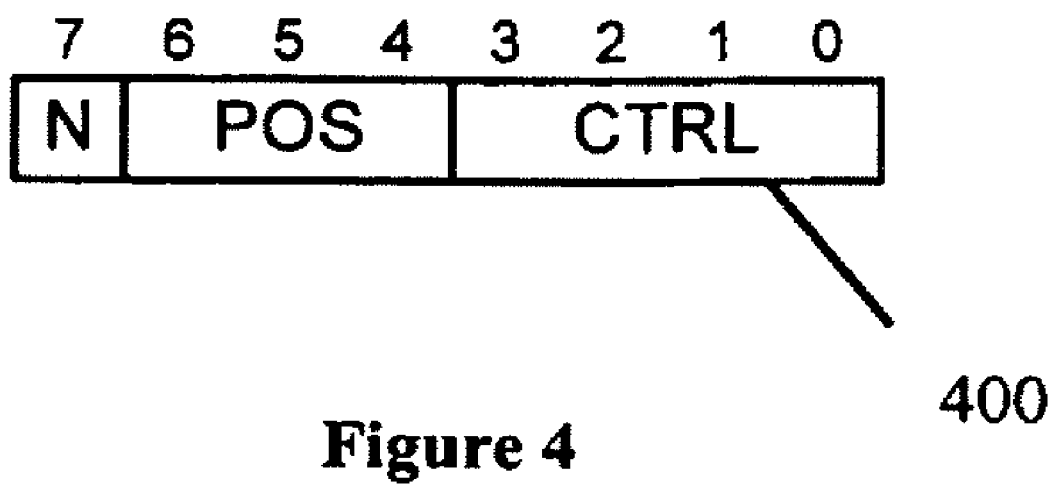
FIG. 4 shows three subfields of a particular control field $C_n$ corresponding to a control character included in a 66-bit codeword according to the first embodiment of the invention.

If at least one of the 8 characters represented by the 66-bit codeword is a control character, then FH=10. For each control character represented by the 66-bit codeword, one of the fields $F_0$-$F_7$, starting with $F_0$, is used as a control field $C_n$ 400 for the $n^{th}$ control character as shown in FIG. 4. The most significant bit (bit 7) of a respective control field is placed at the highest numbered bit within the associated control field of the codeword.

Each of the subfields in the control field $C_n$ is defined as follows.

| N | Definition |
| --- | --- |
| 0 | All subsequent fields are data fields |
| 1 | Next field is a control field |

| POS | Definition |
| --- | --- |
| 000 | Control character is in position 0 (first) |
| 001 | Control character is in position 1 |
| 010 | Control character is in position 2 |
| 011 | Control character is in position 3 |
| 100 | Control character is in position 4 |
| 101 | Control character is in position 5 |
| 110 | Control character is in position 6 |
| 111 | Control character is in position 7 (last) |

| CTRL | Definition |
| --- | --- |
| 0000 | K28.0 |
| 0001 | K28.1 |
| 0010 | K28.2 |
| 0011 | K28.3 |
| 0100 | K28.4 |
| 0101 | K28.5 |
| 0110 | K28.6 |
| 0111 | K28.7 |
| 1000 | K23.7 |
| 1001 | K27.7 |
| 1010 | K29.7 |
| 1011 | K30.7 |
| 1100 | K0.7 |
| 1101 | Reserved |
| 1110 | Reserved |
| 1111 | Reserved |

Figure 5:
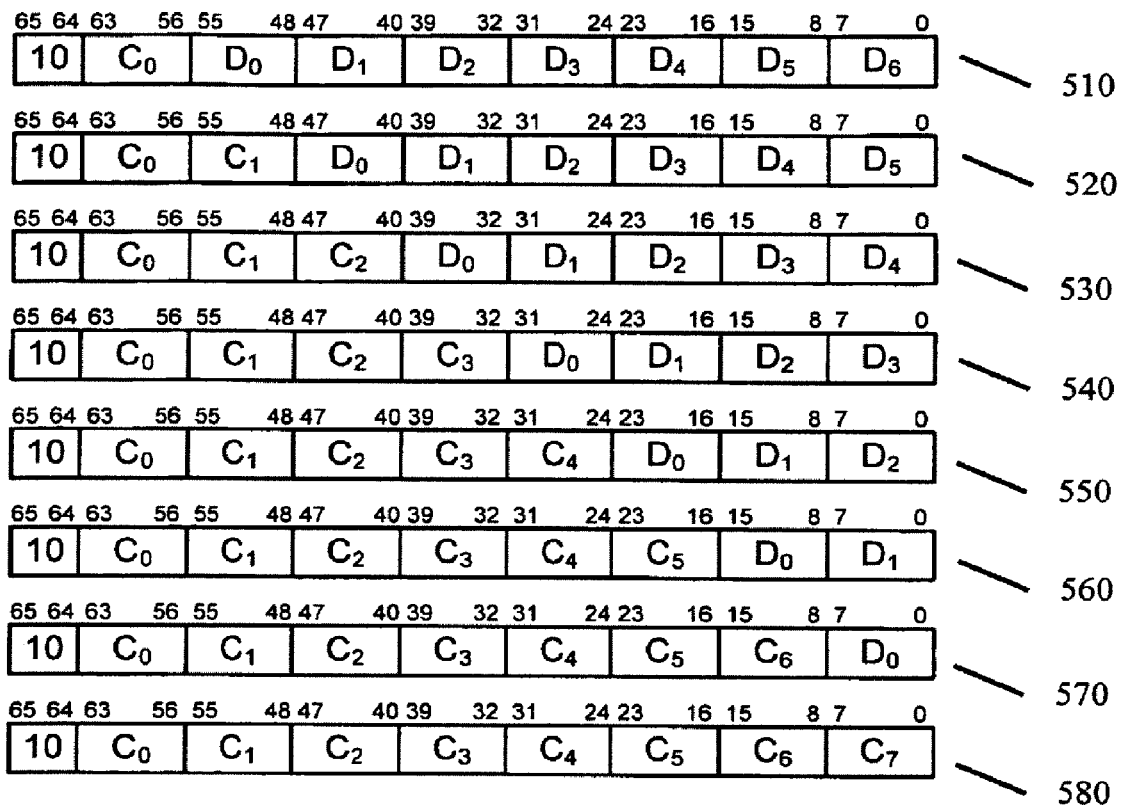
FIG. 5 shows eight different codeword sequences with 1-8 control fields and 7-0 data fields, respectively, corresponding to 1-8 control characters and 7-0 data characters, respectively, according to the first embodiment of the invention.

FIG. 5 shows the various types of codeword structures 510, 520, 530, 540, 550, 560, 570 and 580 for the different possible number of control characters 1-8. The first 66-bit codeword structure 510 shown in FIG. 5 has one control field and seven data fields, representing one control character and seven data characters. The second 66-bit codeword structure 520 as outlined below has two control fields and six data fields. The third 66-bit codeword structure 530 has three control fields and five data fields, and so on. Lastly, the eighth 66-bit codeword structure 580 has eight control fields and no data fields, representing eight control characters and no data characters.

As explained above, the N subfield of each control field $C_n$ indicates whether or not the next field of the 66-bit codeword is a control field or a data field, thereby operating as a sort-of link list. The POS subfield of each control field $C_n$ indicates the actual position of its associated control character within the 8 characters input to the encoder and represented by the 66-bit codeword. Since the control fields are placed at a beginning portion of the 66-bit codeword, their current position within the 66-bit codeword is different from the associated control character true position with respect to the other 7 characters that are represented by the 66-bit codeword. The CTRL subfield of each control field $C_n$ indicates which of 16 possible control characters the control field $C_n$ represents. Because the 8b/10b coding standard, which this 64b/66b coding standard is designed to be compatible with, currently defines 13 possible control characters, the 4 bits reserved for the CTRL subfield are sufficient to make this determination, with three bit combinations reserved.

Independent of the position of the control characters within the block of 8 characters represented by the 66-bit codeword, the control fields $C_n$ are allocated left to right in the codeword, right next to each other. By way of the subfield N, a variable-length sequence of control fields is created to match the number of control characters. Hence, the position of a control character within the block of 8 characters input to the encoder and represented by the codeword is not implied by the position of its associated control field $C_n$ within the codeword, but is rather explicitly defined by the subfield POS in the control field $C_n$. The positions of the data characters input to the encoder and represented by the codeword are in turn defined by the positions of the control characters: the first data character defined by $D_0$ is at the first (left-most) position within the block of 8 characters that is not occupied by a control character, the second data character defined by $D_1$ is at the second such position, etc.

As shown in FIG. 5, in one possible implementation of the first embodiment, the control fields within each 66-bit codeword are provided sequentially at a beginning position of the 66-bit codeword as encoded by the encoder 110, right after the FH field. In another possible implementation of the first embodiment, the control fields are provided sequentially from an end position of the 66-bit codeword (e.g., farthest away from the FH field).

Figure 6:
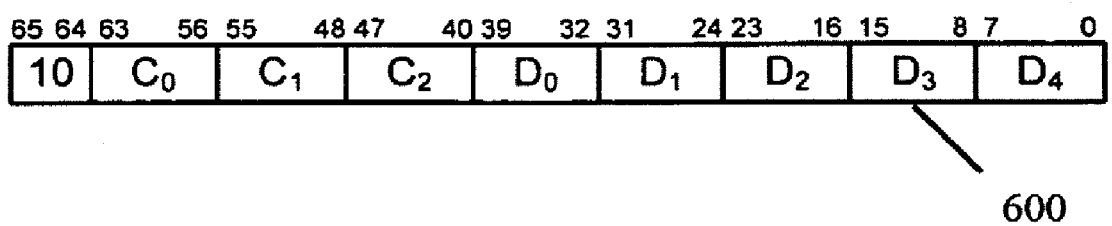
FIG. 6 shows a 66-bit codeword having three control fields and five data fields corresponding to three control characters and five data characters, respectively, according to the first embodiment of the invention.

To exemplify an implementation of the first embodiment, let the 8 characters input to the encoder 110 be: {$33_{16}$, $AA_{16}$, K28.5, $55_{16}$, K28.0, K29.7, $EE_{16}$, $66_{16}$}. There are 3 control characters (K28.5, K28.0 and K29.7) and 5 data characters ($33_{16}$, $AA_{16}$, $55_{16}$, $EE_{16}$ and $66_{16}$) in this 8 character sequence. The data character $33_{16}$ is the first of the 8 characters. The resulting codeword at the output of the encoder 110 has the codeword structure 600 as shown in FIG. 6, which is the same as third codeword structure 530 as shown in FIG. 5.

The detailed individual fields of the codeword of the exemplary implementation are as follows:

| Field | Value | Description |
|---|---|---|
| FH | 10 | This codeword contains control characters |
| $C_0$ | 1 010 0101 | N = 1: Next field is a control field |
|  |  | POS = 010: Control character is at position 2 |

-continued

| Field | Value | Description |
|---|---|---|
|  |  | CTRL = 0101: Control character is K28.5 |
| $C_1$ | 1 100 0000 | N = 1: Next field is a control field |
|  |  | POS = 100: Control character is at position 4 |
|  |  | CTRL = 0000: Control character is K28.0 |
| $C_2$ | 0 101 1010 | N = 0: Subsequent fields are data fields |
|  |  | POS = 101: Control character is at position 5 |
|  |  | CTRL = 1010: Control character is K29.7 |
| $D_0$ | 0011 0011 | Data character, $33_{16}$ (at position 0) |
| $D_1$ | 1010 1010 | Data character, $AA_{16}$ (at position 1) |
| $D_2$ | 0101 0101 | Data character, $55_{16}$ (at position 3) |
| $D_3$ | 1110 1110 | Data character, $EE_{16}$ (at position 6) |
| $D_4$ | 0110 0110 | Data character, $66_{16}$ (at position 7) |

Thus, the 66-bit codeword at the output of the encoder 112 in FIG. 1 is $2A5C05A33AA55EE66_{16}$ in hexadecimal notation, with the most significant bit corresponding to bit position 65. Note that this value is prior to scrambling being applied to bits 0-63 by the scrambler 114.

Because of the very low coding overhead of only 3.125%, the 66b coding scheme according to the first embodiment, as also true for a similar 64b/66b coding scheme, inherently has somewhat poor error detection capabilities if bit errors occur in the transmission channel. Specifically, any bit error within a codeword data field cannot be detected. Furthermore, most bits errors in a codeword control field can not be detected either, as the Hamming distance between valid control fields is very low. To perform optimal error detection, the decoder 120 may, and preferably is designed to:

Check that the FH field is either 01 or 10.
Check that the POS subfields within consecutive control fields are strictly increasing.
Check that the CTRL subfield in a control field is valid (an application requiring fewer different control characters can optimize the error detection performance by allocating codes for the required control characters with maximum Hamming distance).
Check that the N subfield in control field $C_7$ (if present) is 0.

If any of the above requirements are not met, then an error is determined to exist in the 66-bit codeword that has been decoded by the decoder 120. Accordingly, a scheme may be provided to have the encoder 110 re-transmit the 66-bit codeword that was determined to contain an error. A somewhat less strict scheme may have a decoder that checks some but not of the conditions listed above.

Figure 7:
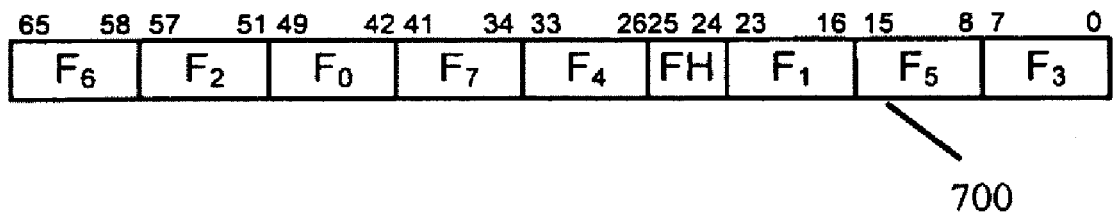
FIG. 7 shows the arrangement of fields in a 66-bit codeword according to a second embodiment of the invention.

In a second embodiment, as shown by the codeword 700 in FIG. 7, the FH field is placed at a predetermined position in the 66-bit codeword other than a beginning portion of the 66-bit codeword. That predetermined position for the FH field corresponds to bit positions 24 and 25 of the 66-bit codeword, and both the encoder and the decoder of the second embodiment recognize ahead of receipt of the codeword that the FH field for each 66-bit codeword is located at the predetermined position. Accordingly, at the decoder, the bit positions 24 and 25 are checked to see whether or not any fields within the 66-bit codeword are control fields, in a manner similar to that discussed above with respect to the first embodiment. Alternatively, the FH field can be placed at any other predetermined position in the 66-bit codeword, as long as the encoder and the decoder recognize such placement. In the other respects, the second embodiment and these alternative implementations are the same as the first embodiment.

In a third embodiment, the bits of each field in the 66-bit codeword do not have to be consecutive or in any particular order, whereby bits from different fields ($F_n$, FH) can be mixed with each other, whereby this mixing is allowed based on the proviso that the encoder and decoder recognize this mixing of bits from different fields. For example, referring to the codeword 700 as shown in FIG. 7, the FH field may be designated as having its LSB (least significant bit) corresponding to bit position 24 and its MSB (most significant bit) corresponding to bit position 58, whereby the $F_6$ field may be designated as having its LSB at bit position 25 and the remaining bits at bit positions 59-65. The encoder and decoder recognize this particular ordering of the bits in each field beforehand, and the decoder can rearrange the bits in order to obtain the information in each field of the 66-bit codeword.

Thus, apparatuses and methods have been described according to the present invention. Many modifications and variations may be made to the techniques and structures described and illustrated herein without departing from the spirit and scope of the invention. For example, in a case whereby DC balancing is not a major issue, the FH field may be a single bit, thereby providing a 64b/65b coding scheme. Also, the placement of the control fields in the 66-bit or 65-bit codeword may be at the beginning or at the ending portion of the codeword, whereby the only proviso being that there are no data fields in between any two adjacently positioned control fields. Furthermore, the present invention may be expanded to cover any type of encoding/decoding scheme whereby the number of control character types is such that each can be definitively defined by a subfield in a control field, such as a subfield of 5 bits that can define up to $2^5=32$ different control character types. In that case, a subfield for defining an actual position of the corresponding control character is limited to 2 bits to thereby allow for $2^2=4$ possible positions for the control character to be designated in this field. A subfield for signifying whether or not the field is a control field or a data field is 1 bit in size (the same as in the previous embodiments). In that case, a 32b/34b or 32b/33b coding scheme (depending on whether or not the FH field is 1 or 2 bits in size) can be created in a manner similar to the description above with respect to the first embodiment, whereby this encoding scheme allows for more possible control character types as compared to the 64b/66b or 64b/65b schemes. Alternatively, if only 8 different control characters are needed, a subfield for defining the actual position of the control character can be 4 bits, thus enabling a 128b/129b or 128b/130b coding scheme (depending on whether or not the FH field is 1 or 2 bits in size) can be created in a manner similar to the description above with respect to the first embodiment, whereby this scheme allows for encoding 16 characters in a single codeword and even lower overhead (0.78% and 1.56%, respectively) as compared to the 64b/66b and 64b/65b schemes. Accordingly, it should be understood that the methods and apparatuses described herein are illustrative only and are not limiting upon the scope of the invention. Further, one or more aspects as described can be combined in any given system or method. Still further, one or more embodiments may be implemented in hardware, e.g., by a schematic design or a hardware description language (HDL), and/or implemented in a programmable logic device (FPGA/CPLD) or an ASIC, and/or they can be implemented in hardware using discrete hardware devices. Alternatively, one or more embodiments may be implemented either partially or entirely in software, such as by using a table-driven lookup mechanism for efficiency.

What is claimed is:

1. A method of transmitting digital data over a transmission medium, the method comprising:

receiving by a receiver digital values representing a plurality of N-bit characters to be output over the transmission medium, each of the N-bit characters being either a data character or a control character;

determining by a controller which, if any, of the plurality of N-bit characters are control characters;

encoding by an encoder the digital values represented by the plurality of N-bit characters to provide an encoded codeword, the encoded codeword being $\{M \times (N-1)+P\}$ bits having M fields of N−1 bits, each of said M fields corresponding to one of the N-bit characters being encoded, wherein the encoding by the encoder further comprises: designating, for each data character, the respective field of the M fields as a data field, designating, for each control character, the respective field of the M fields as a control field, and ordering the M fields to position any control fields at predetermined positions with respect to each other in the encoded codeword and to position any data fields at other remaining positions within the encoded codeword; and transmitting by a transmitter the encoded codeword over the transmission medium;

wherein M and N are integer values greater than 1, and wherein P is an integer value greater than or equal to 1.

2. The method of claim 1, wherein each of control fields in the encoded codeword includes a first subfield providing information indicating an actual position of the corresponding control character of the control field before the order step, and a second subfield providing information of a type of control character.

3. The method of claim 2, wherein the first subfield is 3 bits in size and the second subfield is 4 bits in size, and wherein N equals 9 and M equals 8.

4. The method of claim 2, wherein a total number of different types of control characters is less than or equal to 16.

5. The method of claim 2, wherein a total number of different types of control characters is equal to 13.

6. The method of claim 2, wherein each of the control fields in the encoded codeword includes a third subfield.

7. The method of claim 6, wherein the third subfield is 1 bit in size.

8. The method of claim 6, further comprising:

serializing, using a serializer, the encoded codeword as serial data after the encoding step and before the transmitting step, such that the encoded codeword transmitted over the transmission medium in the transmitting step is serial data.

9. The method of claim 6, wherein the third subfield provides information indicating whether or not a next field in position within the encoded codeword is a control field.

10. The method of claim 1, wherein each of the N-bit characters comprises a single control bit.

11. The method of claim 1, wherein the step of encoding further comprising:

scrambling by the encoder the digital values to provide DC balancing.

12. The method of claim 11, wherein the determining step comprises checking the control bit to determine whether the corresponding N-bit character is a data character or a control character.

13. The method of claim 1, further comprising:

setting the encoder P bits of the $\{M \times (N-1)+P\}$-bit codeword representing control bits to a first value that indicates that none of the M fields of N−1-bits in the codeword is a control field; and setting the encoder P-control bits to a second value that indicates that at least one of the M fields of N−1-bits in the codeword is a control field.

14. The method of claim 1, wherein the encoder has no restrictions on the respective number or ordering of any control and data characters.

15. The method of claim 14, wherein M equals 4, 8 or 16, N equals 8 or 9, and P equals 1 or 2, and
wherein the first value corresponds to a bit sequence of '0', '1', '01' or '10', and wherein the second value corresponds to a bit sequence of '1', '0', '10' or '01'.

16. The method of claim 1, further comprising:
allocating bit values in the M fields of N−1-bits to have a maximal Hamming distance, in order to improve error detection performance.

17. A method of receiving digital data over a transmission medium, the method comprising:
receiving by a receiving unit a {M×(N−1)+P}-bit codeword that has been output over the transmission medium, the {M×(N−1)+P}-bit codeword including M fields of N−1 bits;
determining by a determining unit whether any of the M fields included in the {M×(N−1)+P}-bit codeword represent control characters; and
decoding by a decoding unit the {M×(N−1)+P}-bit codeword to obtain digital values that represent M consecutive N-bit characters that respectively correspond to the M fields of N−1 bits included in the {M×(N−1)+P}-bit codeword, each of the M fields being either a data field or a control field, wherein the decoding step includes re-ordering the M fields of N−1 bits based on position information provided within any control fields of the M fields of N−1 bits;
wherein M and N are integer values greater than 1, and wherein P is an integer value greater than or equal to 1.

18. The method of claim 17, wherein each of control fields in the {M×(N−1)+P}-bit codeword includes a first subfield providing information indicating an actual position of the corresponding control character of the control field before the order step, and a second subfield providing information of a type of control character.

19. The method according to claim 18, wherein the first subfield is 3 bits in size and the second subfield is 4 bits in size, and wherein N equals 9 and M equals 8.

20. The method of claim 18, wherein each of the control fields in the {M×(N−1)+P}-bit codeword includes a third subfield providing information indicating whether or not a next field in position within the encoded codeword is a control field.

21. The method according to claim 20, wherein the first subfield is 3 hits in size, the second subfield is 4 bits in size, and the third subfield is 1 bit in size, and wherein N equals 9 and M equals 8.

22. The method of claim 17, wherein the determining step comprises:
determining whether the P bits of the {M×(N−1)+P}-bit codeword represent control bits that are set to a first value that indicates that none of the M fields of N−1-bits in the codeword is a control field, or are set to a second value that indicates that at least one of the M fields of N−1-bits in the codeword is a control field.

23. The method of claim 17, wherein M equals 4, 8 or 16, N equals 8 or 9, and P equals 1 or 2, and wherein the first value corresponds to a bit sequence of '0', '1', '01' or '10', and wherein the second value corresponds to a bit sequence of '1', '0', '10' or '01'.

24. The method of claim 17, wherein the decoding step has no restrictions on the respective number or ordering of any control and data characters.

* * * * *